(12) United States Patent
Grazzi et al.

(10) Patent No.: US 8,663,763 B2
(45) Date of Patent: Mar. 4, 2014

(54) THERMOSHRINKABLE FILMS

(75) Inventors: Michele Grazzi, Casaglia (IT); Paulo Bassi, Ferrara (IT); Andrea Felisati, Ferrara (IT); Giampaolo Pellegatti, Boara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/504,454

(22) PCT Filed: Nov. 5, 2010

(86) PCT No.: PCT/EP2010/066869
§ 371 (c)(1),
(2), (4) Date: May 22, 2012

(87) PCT Pub. No.: WO2011/061067
PCT Pub. Date: May 26, 2011

(65) Prior Publication Data
US 2013/0129997 A1    May 23, 2013

Related U.S. Application Data

(60) Provisional application No. 61/281,690, filed on Nov. 20, 2009.

(30) Foreign Application Priority Data
Nov. 17, 2009 (EP) .................................. 09176219

(51) Int. Cl.
*B29D 22/00* (2006.01)
(52) U.S. Cl.
USPC .................. 428/35.7; 428/36.92; 525/240

(58) Field of Classification Search
USPC .................... 428/36.91, 36.92, 35.7; 525/240
See application file for complete search history.

(56) References Cited

U.S. PATENT DOCUMENTS

| 4,256,784 A | | 3/1981 | Gebhardt et al. | |
|---|---|---|---|---|
| 4,399,054 A | | 8/1983 | Ferraris et al. | |
| 4,532,189 A | | 7/1985 | Mueller | |
| 4,557,261 A | * | 12/1985 | Rugheimer | 604/533 |
| 5,250,041 A | * | 10/1993 | Folden et al. | 604/284 |
| 5,857,715 A | * | 1/1999 | Gray et al. | 285/131.1 |
| 2010/0227096 A1 | * | 9/2010 | Porfido et al. | 428/36.9 |

FOREIGN PATENT DOCUMENTS

| EP | 0045977 | 8/1981 |
|---|---|---|
| EP | 0586160 | 8/1993 |
| EP | 0595252 | 5/1994 |
| EP | 0361493 | 11/1994 |
| EP | 0728769 | 8/1996 |
| WO | WO-97/22475 | 6/1997 |
| WO | WO-03054035 | 7/2003 |
| WO | WO-2009/077287 | 6/2009 |

* cited by examiner

Primary Examiner — N. Edwards

(57) ABSTRACT

An oriented monolayer or multilayer film, wherein the monolayer film comprises a copolymer (A1) of propylene with hexene-1 containing from 4 to 10% by weight of hexene-1 and having MFR from 0.5 to 10 g/10 min., and the multilayer film comprises at least 30% by weight of said copolymer (A1), both the monolayer and the multilayer film being obtainable with a process comprising a drawing step wherein the film is drawn with a draw ratio of at least 3, in at least one direction.

8 Claims, No Drawings

THERMOSHRINKABLE FILMS

This application is the U.S. national phase of International Application PCT/EP2010/066869, filed Nov. 5, 2010, claiming priority to European Application 09176219.5 filed Nov. 17, 2009 and the benefit under 35 U.S.C. 119(e) of U.S. Provisional Application No. 61/281,690, filed Nov. 20, 2009; the disclosures of International Application PCT/EP2010/066869, European Application 09176219.5 and U.S. Provisional Application No. 61/281,690, each as filed, are incorporated herein by reference.

This invention relates to mono- and multilayer thermoshrinkable films comprising a copolymer of propylene with hexene-1.

The polyolefin thermoshrinkable films known in the art are generally multilayer films. Multilayer thermoshrinkable films usually consist of a middle layer essentially made up of an LLDPE modified with octene-1 and 2 outer layers which are intended to prevent the film sticking together during working and to improve the processability of the film. It is known in fact that certain aspects of the production of thermoshrinkable films based on LLDPE are critical because the temperature at which the orientation process takes place is close to the temperature at which the polymer melts. There may thus be problems such as tearing of the film and instability of the bubble when the film is produced by the double bubble method.

Examples of thermoshrinkable multilayer films are given in U.S. Pat. No. 4,532,189. This patent describes films with 3 or 5 layers in which the middle layer is made up of linear low- or medium-density ethylene copolymers (LLDPE or LMDPE). Ethylene/propylene copolymers (EPC), ethylene/vinyl-acetate copolymers (EVA) or low-density polyethylene (LDPE) can be added to the middle layer. The outer layers are made up of EPC, with the possible addition of homopolymeric polypropylene (PP), LLDPE or LMDPE. Any intermediate layers are made up of EVA or mixtures of LLDPE or LMDPE with ionomeric resins. According to what is reported in the said patent, the film has good physicomechanical characteristics.

Patent application EP-A-586160 describes a thermoshrinkable multilayer film with 3 or 5 layers in which the middle layer is made up of LLDPE. The outer layers may be made up of blends of EPC with polybutene (PB), or else blends of PP or EPC with a propylene/butene copolymer (PBC), or of PBC. The patent application reports that the film has good lap seal strength characteristics.

Patent application EP-A-595252 describes 3-layer thermoshrinkable films in which the middle layer is made up of LLDPE to which additives such as hydrogenated hydrocarbon resins, polyethylene or polypropylene waxes, VLDPE, etc., are added. The addition of these additives is claimed to give improved physicomechanical characteristics and improved lap seal strength to the films. The outer layers are made up of PP or EPC, also with the addition of the compounds mentioned above.

The said films present various problems, however, depending on the composition of the various layers. If the outside layer is made up of PP and/or EPC, for example, the film can only be heat-sealed at relatively high temperature. In addition, the working range within which the orientation process can be carried out, i.e. the temperature range within which the film can be oriented without there being problems of the film itself tearing or instability of the bubble, is restricted and shifted towards relatively high temperatures. The use of PBC in the outer layers is claimed to reduce the sealability temperature but—especially when the copolymer contains large amounts of butene—has the disadvantage of increasing the percentage of polymer extractable in organic solvents to levels which are not acceptable for applications of the film in the food sector. In all cases, the linking of polyethylene-based layers with polypropylene-based layers can cause problems of delamination of the resultant film, because of the poor compatibility between the various layers.

With a view to overcoming the said disadvantages, WO97/22475 describes multilayer thermoshrinkable films having an improved balance of physicomechanical properties, processability and sealability at low temperatures, in which at least one layer comprises LLDPE and at least one layer comprises a polyolefin composition comprising a copolymer of propylene with ethylene and/or one or more $CH_2=CHR^1$ α-olefins, where $R^1$ is a hydrocarbon radical having 2-10 carbon atoms, containing more than 70% by weight of propylene, the said polyolefin composition having a xylene-insoluble fraction greater than 85%, a maximum melting peak at temperatures above 130° C. and a crystallinity content such that at 90° C. the percentage of material melted is greater than 10%.

It has now been found that improved mechanical and optical properties, with respect to conventional films based on LLDPE copolymers, are obtained in thermoshrinkable films when they comprise substantial amounts of a particular copolymer of propylene with hexene-1.

Thus the present invention provides an oriented monolayer or multilayer film, wherein the monolayer film comprises a copolymer (A1) of propylene with hexene-1 containing from 4 to 10% by weight, preferably from 5 to 9% by weight, of hexene-1 and having Melt Flow Rate (MFR, measured according to ISO 1133, 230° C./2.16 kg, i.e. at 230° C. with 2.16 kg load) from 0.5 to 10 g/10 min., and the multilayer film comprises at least 30% by weight, preferably at least 40% by weight, in particular at least 92% by weight (the upper limit being 100% by weight for all ranges), of said copolymer (A1), both the monolayer and the multilayer film being obtainable with a process comprising a drawing step wherein the film is drawn with a draw ratio of at least 3, preferably of at least 4, in at least one direction.

Preferably in the drawing step the film of the present invention is drawn with the said draw ratio both in the machine and in the transversal direction.

The film of the invention can be conveniently produced using processes known in the art, such as the tenter frame process or the double bubble process.

Double bubble films are preferred, as they are characterised by particularly well balanced shrink properties introduced by the process.

The double bubble process comprises the following main steps:
a) preparation of a tube by extruding the polymer material through a circular die;
b) orientation of the said tube;
c) cooling and trimming of the oriented tube.

Preferably the orientation step b) occurs after the tube prepared in a) has been cooled and then reheated to a temperature near the melting temperature of the polymer material.

In details, the double bubble process comprises the following steps.

Extrusion

The polymer components in form of granules are fed via feed hoppers into extruders where the polymers are first melted, compressed, mixed and finally metered out with a constant rate. The necessary heat to melt the polymers is provided by heater bands around the barrels and mainly by the frictional heat coming from the polymer moving between the screw and the barrel.

Main Step a)—Preparation of a Primary Tube by Die-Forming

In this step the materials are set to theirs final shape and size. The molten polymers leave the circular die and are instantly cooled by means of a water cooling ring with a dry internal calibrator to obtain a thick primary tube. The diameter of this primary tube is fairly small (300 to 400 mm). By effect of the said cooling, the temperature at the surface of the tube is lowered to less than 160° C., preferably less than 100° C., in particular less than 50° C.

Main Step b)—Orientation

The tube is then conveyed to the top of the double bubble line and is then guided through a set of infrared heaters/ovens. When the bubble has reached a temperature near to the melting temperature of the polymer material (about 10 to 5° C. less than the said melting temperature), it is blown by means of air. Bi-axial orientation is obtained by drawing simultaneously by inflation and by a different speed ratio between the nip rolls before and after the ovens. As previously said, the draw ratio is of at least 3, preferably of at least 4. Usually it is of 5 to 6 times in both directions. Such a balanced orientation, resulting from the said drawing treatment, makes this process ideal for making films where balanced properties, such as shrinkage, are desired.

Main Step c)—Cooling and Trimming

After the orientation step, the bubble is cooled with cooling rings, flattened and optionally edge trimmed. Two separate film rolls are obtained on two independent winding stations. The winding units are often mounted on a total rotating platform.

In the multilayer films, at least one layer comprises the copolymer of the present invention. It is preferable that at least the base layer (also called "support layer") comprise the copolymer of the present invention. The other layer(s) may comprise other kinds of polymers.

Examples of olefin polymers that can be used for the other layers are polymers or copolymers, and their mixtures, of $CH_2$=CHR olefins where R is a hydrogen atom or a $C_1$-$C_8$ alkyl radical. Particularly preferred are the following polymers:

a) isotactic or mainly isotactic propylene homopolymers, and homopolymers or copolymers of ethylene, like HDPE, LDPE, LLDPE;
b) Semi-crystalline copolymers of propylene with ethylene and/or $C_4$-$C_{10}$ α-olefins, such as for example butene-1, pentene-1, hexene-1,4-methyl-1-pentene, octene-1, wherein the total comonomer content ranges from 0.05% to 20% by weight with respect to the weight of the copolymer, or mixtures of said copolymers with isotactic or mainly isotactic propylene homopolymers;
c) elastomeric copolymers of ethylene with propylene and/or a $C_4$-$C_{10}$ α-olefin, optionally containing minor quantities (in particular, from 1% to 10% by weight) of a diene, such as butadiene, 1,4-hexadiene, 1,5-hexadiene, ethylidene-1-norbornene, wherein the ethylene amount is from 15 to 82% by weight;
d) heterophasic copolymers comprising a propylene homopolymer and/or one of the copolymers of item b), and an elastomeric fraction comprising one or more of the copolymers of item c), typically prepared according to known methods by mixing the components in the molten state, or by sequential polymerization, and generally containing the said elastomeric fraction in quantities from 5% to 90% by weight;
e) butene-1 homopolymers or copolymers, wherein the comonomer(s) are selected from ethylene, propylene and other α-olefins.

Examples of polymers different from polyolefins, employable for the other layers, are polystyrenes, polyvynylchlorides, polyamides, polyesters and polycarbonates, copolymers of ethylene and vinyl alcohol (EVOH) and "tie layer" resins.

The multilayer film of this invention preferably has a three layer structure. In particular, when it has a structure with three layers ABA, wherein layer B is the base layer, such layer B comprises the copolymer (A1) of propylene with hexene-1, while the layers A can independently comprise the copolymer (A1) and/or other polymers as above described. The various layers can be present in variable amounts relative to the total weight of the film. Each of the two layers A is preferably present in amounts that generally range from about 5 to about 45% of the total weight of the film. More preferably, each of the A layers is present in amounts between 10 and 30%. The two A layers are preferably present in equal parts.

The total thickness of the film is preferably from 10 to 50 µm, more preferably from 10 to 30 µm.

The film of the present invention is in particular characterized by improved levels of tensile properties and Haze, in combination with excellent shrink values at high temperatures (reason why it qualifies as thermoshrinkable).

Moreover, as the copolymer (A1) has a very low content of n-hexane extractables, the film of the present invention can be employed in food packaging, in particular for cooking.

The said amounts of hexene-1 in the copolymer (A1) are referred to the total weight of such copolymer.

Other comonomers, selected in particular from ethylene and $CH_2$=CHR α-olefins where R is a $C_2$-$C_8$ alkyl radical, hexene-1 excluded, can be present, provided that the final properties of the copolymer are not substantially worsened. Examples of the said $CH_2$=CHR α-olefins are butene-1, pentene-1,4-methyl-1-pentene, octene-1. Among the said other comonomers, ethylene is preferred.

Indicatively, the total amount of comonomer(s) different from propylene and hexene-1 in the copolymer (A1) is from 0.5 to 2% by weight, referred to the total weight of the copolymer.

From the above definition, it is evident that the term "copolymer" includes polymers containing more than one kind of comonomers, such as terpolymers.

The copolymer (A1) can also be a composition of two or more copolymer components containing different amounts of comonomer(s), provided that the total amount of hexene-1 be in the above said ranges.

In particular, the copolymer (A1) can comprise:
i) from 30 to 50% by weight of a copolymer component containing from 1 to 4% by weight of hexene-1;
ii) from 50 to 70% by weight of a copolymer component containing from 6 to 10% by weight of hexene-1.

Moreover, the copolymer (A1) is semicrystalline, as it has a crystalline melting point, and typically has a stereoregularity of isotactic type.

Preferably, said copolymer exhibits at least one of the following features:
  hexene-1 content from 5 to 10% by weight, more preferably from 5 to 8% by weight, in particular from 6 to 8% by weight;
  a melting temperature of from 125 to 150° C., more preferably from 125 to 145° C., determined by differential scanning calorimetry, according to ISO 11357-3, with a heating rate of 20° C./minute;

a solubility in xylene at room temperature (i.e. about 25° C.) equal to or lower than 25% by weight, preferably equal to or lower than 20% by weight;

content of fraction extractable in n-hexane of less than 5.5% by weight, more preferably equal to or lower than 4% by weight, in particular equal to or lower than 2.6% by weight, measured according to FDA 177, 1520;

Isotacticity Index equal to or higher than 97%, determined as m diads/total diads using $^{13}$C-NMR;

a molecular weight distribution expressed by the $\overline{M}w/\overline{M}n$ ratio, measured by GPC, (Gel Permeation Chromathograpy), from 4 to 7.

It has been found that the above said features can be obtained with polymerization processes carried out in the presence of stereospecific Ziegler-Natta catalysts supported on magnesium dihalides.

The polymerization process, which can be continuous or batch, is carried out following known techniques and operating in liquid phase, in the presence or not of inert diluent, or in gas phase, or by mixed liquid-gas techniques. It is preferable to carry out the polymerization in gas phase.

Polymerization reaction time, pressure and temperature are not critical, however it is best if the temperature is from 20 to 100° C. The pressure can be atmospheric or higher.

The regulation of the molecular weight is carried out by using known regulators, hydrogen in particular.

The said stereospecific polymerization catalysts comprise the product of the reaction between:

1) a solid component, containing a titanium compound and an electron-donor compound (internal donor) supported on magnesium dihalide (preferably chloride);
2) an aluminum alkyl compound (cocatalyst); and, optionally,
3) an electron-donor compound (external donor).

Said catalysts are preferably capable of producing homopolymers of propylene having an isotactic index higher than 90% (measured as weight amount of the fraction insoluble in xylene at room temperature).

The solid catalyst component (1) contains as electron-donor a compound generally selected among the ethers, ketones, lactones, compounds containing N, P and/or S atoms, and mono- and dicarboxylic acid esters.

Catalysts having the above mentioned characteristics are well known in the patent literature; particularly advantageous are the catalysts described in U.S. Pat. No. 4,399,054 and European patent 45977.

Particularly suited among the said electron-donor compounds are phthalic acid esters and succinic acid esters.

Suitable succinic acid esters are represented by the formula (I):

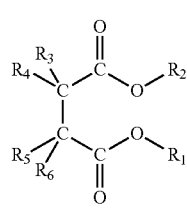

wherein the radicals $R_1$ and $R_2$, equal to or different from each other, are a C1-C20 linear or branched alkyl, alkenyl, cycloalkyl, aryl, arylalkyl or alkylaryl group, optionally containing heteroatoms; the radicals $R_3$ to $R_6$ equal to or different from each other, are hydrogen or a C1-C20 linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably C1-C8 alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from C1-C20 linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred.

Other electron-donors particularly suited are the 1,3-diethers, as illustrated in published European patent applications EP-A-361 493 and 728769.

As cocatalysts (2), one preferably uses the trialkyl aluminum compounds, such as Al-triethyl, Al-triisobutyl and Al-tri-n-butyl.

The electron-donor compounds (3) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical). Examples of the said silicon compounds are those of formula $R_a^1 R_b^2 Si(OR^3)_c$, where a and b are integer numbers from 0 to 2, c is an integer from 1 to 3 and the sum (a+b+c) is 4; $R^1$, $R^2$, and $R^3$ are alkyl, cycloalkyl or aryl radicals with 1-18 carbon atoms optionally containing heteroatoms.

Thexyltrimethoxysilane (2,3-dimethyl-2-trimethoxysilyl-butane) is particularly preferred.

The previously said 1,3-diethers are also suitable to be used as external donors. In the case that the internal donor is one of the said 1,3-diethers, the external donor can be omitted.

The catalysts may be precontacted with small quantities of olefin (prepolymerization), maintaining the catalyst in supension in a hydrocarbon solvent, and polymerizing at temperatures from room to 60° C., thus producing a quantity of polymer from 0.5 to 3 times the weight of the catalyst.

The operation can also take place in liquid monomer, producing, in this case, a quantity of polymer up to 1000 times the weight of the catalyst.

As is known to experts in the field, and as can be easily determined by routine tests, it is obviously possible to add further polymer components and additives (such as adhesion enhancers, stabilizers, antioxidants, anticorrosives, processing aids, etc.) and both organic and inorganic fillers which can give specific properties to the film of the invention.

The thermoshrinkable film of this invention has broad applications in the packaging sector, particularly the packaging of small objects, food, etc.

The following examples are given as illustrations and do not restrict the invention.

EXAMPLES

Unless otherwise specified, the properties indicated in the description and examples are determined by the following methods.

1-Hexene Content and Isotacticity

Determined by $^{13}$C-NMR spectroscopy.

$^{13}$C-NMR spectra are acquired on a Bruker DPX-600 spectrometer operating at 150.91 MHz in the Fourier transform mode at 120° C.

The samples are dissolved in 1,1,2,2-tetrachloroethane-d2 at 120° C. with a 8% wt/v concentration. Each spectrum is acquired with a 90° pulse, 15 seconds of delay between pulses and CPD (WALTZ 16) to remove $^1$H-$^{13}$C coupling. About 1500 transients are stored in 32K data points using a spectral window of 6000 Hz.

The peak of the Propylene CH is used as internal reference at 28.83 ppm.

The evaluation of diad distribution and the composition is obtained from Sαα using the following equations:

$$PP=100S\alpha\alpha(PP)/\Sigma$$

$$PH=100S\alpha\alpha(PH)/\Sigma$$

$$HH=100S\alpha\alpha(HH)/\Sigma$$

Where $\Sigma=\Sigma S\alpha\alpha$ $$[P]=PP+0.5PH$$

$$[H]=HH+0.5PH$$

Ethylene, Butene-1 and Octene-1 Content

Determined by IR spectroscopy.

Melt Flow Rate

Determined according to ISO 1183, at 230° C., 2.16 kg (equivalent to ASTM D 1238, condition L).

Solubility in Xylene 2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 0° C. for 30 minutes as well, followed by 30 minutes at 25° C. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

N-Hexane Extractable Fraction

Determined according to FDA 177, 1520, by suspending in an excess of n-hexane a 100 μm thick film specimen of the composition being analyzed, in an autoclave at 50° C. for 2 hours. Then the hexane is removed by evaporation and the dried residue is weighed.

Melting Temperature (ISO 11357-3)

Determined by differential scanning calorimetry (DSC). A sample weighting 6±1 mg, is heated to 200±1° C. at a rate of 20° C./min and kept at 200±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 200° C.±1. The melting scan is recorded, a thermogram is obtained, and, from this, temperatures corresponding to peaks are read. The temperature corresponding to the most intense melting peak recorded during the second fusion is taken as the melting temperature.

$\overline{M}_w$ and $\overline{M}_n$

Measured by way of Gel Permeation Chromatography (GPC), preferably carried out in 1,2,4-trichlorobenzene; in detail, the samples are prepared at a concentration of 70 mg/50 ml of stabilized 1,2,4 trichlorobenzene (250 μg/ml BHT (CAS REGISTRY NUMBER 128-37-0)); the samples are then heated to 170° C. for 2.5 hours to solubilize; the measurements are run on a Waters GPCV2000 at 145° C. at a flow rate of 1.0 ml/min. using the same stabilized solvent; three Polymer Lab columns are used in series (Plgel, 20 μm mixed ALS, 300×7.5 mm).

Haze

Determined according to ASTM method D 1003.

Clarity

Determined according to ASTM D 1746.

Gloss at 45°

Determined according to ASTM D 2457.

Tensile Modulus

Determined according to ASTM D882, both in the machine direction (MD) and in the transverse direction (TD).

Tensile Strength and Elongation at Break

Determined according to ISO 527.

Shrinkage

Determined according to ASTM D 2732, both in the machine direction (MD) and in the transverse direction (TD).

S.I.T.

From the films prepared as described below in the specific examples, specimens 2 cm wide are cut.

For each test two of the above specimens are superimposed in alignment. The superimposed specimens are sealed along one of the 2 cm sides with a Brugger Feinmechanik Sealer, model HSG-ETK 745. Sealing time is 5 seconds at a pressure of 0.1 N/mm². The sealing temperature is increased for each seal, starting from about 10° C. less than the melting temperature of the test composition. The sealed samples are left to cool and then their unsealed ends are attached to an Instron machine where they are tested at a traction speed of 50 mm/min.

The S.I.T. is the minimum sealing temperature at which the seal does not break when a load of at least 2 Newtons is applied in the said test conditions.

Example 1

The copolymer (A1) is prepared as follows.

The solid catalyst component used in polymerization is a highly stereospecific Ziegler-Natta catalyst component supported on magnesium chloride, containing about 2.2% by weight of titanium and diisobutylphthalate as internal donor, prepared by analogy with the method described in WO03/054035 for the preparation of catalyst component A.

Catalyst System and Prepolymerization Treatment

Before introducing it into the polymerization reactor, the solid catalyst component described above is contacted at 15° C. for 3.8 minutes with aluminum triethyl (TEAL) and thexyltrimethoxysilane, in a TEAL/thexyltrimethoxysilane weight ratio equal to about 12.5 and in such quantity that the TEAL/solid catalyst component weight ratio be equal to about 7.8.

The catalyst system is then subjected to prepolymerization by maintaining it in suspension in liquid propylene at 20° C. for about 19 minutes before introducing it into the polymerization reactor.

Polymerization

The polymerization is carried out in a gas phase polymerization reactor by feeding in a continuous and constant flow the prepolymerized catalyst system, hydrogen (used as molecular weight regulator), propylene and hexene-1 in the gas state.

The main polymerization conditions are:
Temperature: 75° C.
Pressure: 1.6 MPa;
molar ratio $H_2/C3$-: 0.0051-0.0033;
molar ratio C6-/(C6-+C3-): 0.0198-0.0224;
residence time: 44.6 minutes.
Note: C3-=propylene; C6-=hexene-1.

A polymer yield of 18100 g of polymer/g of solid catalyst component is obtained.

The polymer particles exiting the reactor are subjected to a steam treatment to remove the reactive monomers and volatile substances, and then dried.

The resulting propylene copolymer (A1) contains 7.5% by weight of hexene-1. Moreover said propylene copolymer (A1) has the following properties:
MFR: 1.8 g/10 min.;
Amount of fraction soluble in xylene: 16.3% by weight;
Melting temperature: 133.4° C.

Production of the Film

A monolayer film is produced by the double bubble method with the following steps:
- feeding of copolymer (A1) in the two extruders and extrusion of a monolayer tubular film with head temperature of 190° C.;
- cooling of the primary tubular film in a water bath set up at 15° C.;
- heating of the primary film in an oven with IR rays or with hot air;
- biorientation with a 6/6 longitudinal/transverse stretch ratio;
- cooling of the bioriented tubular film to temperatures around 25° C.

A film about 20 μm thick is so obtained.

The optical and mechanical features of the film and its S.I.T. value are shown in Table 1.

Comparative Example 1

A monolayer film is produced by operating as in Example 1 but using, instead of copolymer (A1), a copolymer of ethylene with 3.1 mol % of octene-1, having density of 0.920 g/cm$^3$ (determined according to ISO 1183) and MFR E (ISO 1183, at 190° C., 2.16 kg) of 1 g/10 min.

The optical and mechanical features of the film and its S.I.T. value are shown in Table 1.

TABLE 1

| Property | Example 1 | Comparative Example 1 |
|---|---|---|
| Haze (%) | 1.7 | 3 |
| Clarity (%) | 98.5 | 98.2 |
| Gloss at 45° (%) | 87.7 | 88.1 |
| Tensile Modulus MD/TD (N/mm$^2$) | 810/830 | 515/520 |
| Tensile strength at break MD/TD (MPa) | 120/150 | 107/104 |
| Deformation at Break MD/TD (mm) | 80/85 | 120/150 |
| Shrinkage MD/TD at 100° C. (%) | 20/28 | 24/33 |
| Shrinkage MD/TD at 120° C. (%) | 54/60 | 65/64 |
| S.I.T. (° C.) | 110 | 111 |

The invention claimed is:

1. A film comprising:
   an oriented monolayer film comprising:
   a polymer composition (A1) that comprises:
   (i) from 50 to 70% by weight of a copolymer of propylene and hexene-1 wherein the copolymer of propylene and hexene-1 comprises from 4 to 10% by weight of hexene-1, based upon the total weight of the copolymer of propylene and hexene-1; and
   (ii) from 30 to 50% by weight of a copolymer component containing from 1 to 4% by weight of hexene-1;
   wherein the film is produced by a process comprising a drawing step wherein the film is drawn with a draw ratio of at least 3 in at least one direction.

2. The film of claim 1, wherein (i) has a melting temperature of from 125 to 150° C., determined by differential scanning calorimetry, according to ISO 11357-3, with a heating rate of 20° C./minute.

3. The film of claim 1, wherein (i) has a solubility in xylene at room temperature of at most 25% by weight.

4. The film of claim 1, wherein the copolymer of propylene of hexene-1 comprises from 6 to 10% by weight of hexene-1 and has a melt flow rate ranging from 0.5 to 10 g/10 min, measured according to ISO 1133, 230° C./2.16 kg.

5. The film of claim 1, obtained by extruding A) with a double bubble process.

6. Packaging systems comprising the film of claim 1.

7. The film of claim 4, wherein the film is an oriented multilayer film.

8. The film of claim 1 wherein the draw ratio is at least 4 in at least one direction.

* * * * *

UNITED STATES PATENT AND TRADEMARK OFFICE
CERTIFICATE OF CORRECTION

PATENT NO. : 8,663,763 B2
APPLICATION NO. : 13/504454
DATED : March 4, 2014
INVENTOR(S) : Michele Grazzi et al.

It is certified that error appears in the above-identified patent and that said Letters Patent is hereby corrected as shown below:

On the title page

Item (75)    Line 1    Delete "Paulo" and insert --Paolo--, therefor

In the specification

Column 3    Line 18    Delete "10 to 5° C." and insert --5 to 10° C.--, therefor Column 5    Line 10    Delete " $\overline{Mw}/\overline{Mn}$ " and insert -- $\overline{M}_w/\overline{M}_n$ --, therefor Column 5    Line 63    Delete "C1-C20" and insert --$C_1$-$C_{20}$--, therefor Column 5    Line 66    Delete "C1-C20" and insert --$C_1$-$C_{20}$--, therefor Column 6    Line 4    Delete "C1-C8" and insert --$C_1$-$C_8$--, therefor Column 6    Line 17    Delete "C1-C20" and insert --$C_1$-$C_{20}$--, therefor Column 9    Line 10    Delete "C3" and insert --$C_3$--, therefor Column 9    Line 11    Delete "C6-/(C6-+C3-)" and insert --$C_6$-/($C_6$-+$C_3$-)--, therefor Column 9    Line 13    Delete "C3" and insert --$C_3$--, therefor Column 9    Line 13    Delete "C6" and insert --$C_6$--, therefor Signed and Sealed this
Twenty-sixth Day of April, 2016

Michelle K. Lee
*Director of the United States Patent and Trademark Office*